United States Patent Office 3,642,959
Patented Feb. 15, 1972

3,642,959
PROCESS FOR PREPARING ALKYL ARYL
PHOSPHATES
George M. Nichols, Chicago, Ill., assignor to Stauffer
Chemical Company, New York, N.Y.
No Drawing. Filed Oct. 11, 1968, Ser. No. 766,957
Int. Cl. C07f 9/18
U.S. Cl. 260—973    11 Claims

ABSTRACT OF THE DISCLOSURE

Process for the preparation of alkyl aryl phosphates useful as gasoline additives, polymers plasticizers, hydraulic fluids, and the like which comprises forming a a solution of an aryl phosphorohalidate in a cosolvent mixture of an inert aliphatic hydrocarbon solvent having from 5 to 10 carbon atoms and an inert aromatic hydrocarbon solvent selected from the group consisting of benzene, toluene, xylene and mixtures thereof; heating the reaction mixture to reflux temperatures; incrementally adding an alcohol to the refluxing solution to effect alkoxylation of the aryl phosphorohalidate with the attendant formation of a haloacid by-product; and refluxing the solution for a period of time sufficient to remove substantially all by-product haloacid from the solution.

---

This invention relates to an improved process for the manufacture of alkyl aryl phosphates and especially to an improved and continuous process for the large scale commercial manufacture of monoalkyl diaryl phosphate esters.

Methyl diphenyl phosphate has long been known to be useful as an additive for gasoline. However, until now there has been no commercially acceptable process for the large scale manufacture of this compound. An important reason why known processes have not been adaptable to commercial practice is because of the poor yields of product resultant from the use of these methods. The yields of methyl diphenyl phosphate by any of the hithertofore known processes have been in the order of about 70%.

A well known theoretically possible reaction for the production of methyl diphenyl phosphate is the reaction of methanol with diphenyl phosphorochloridate according to the following formula:

(I)

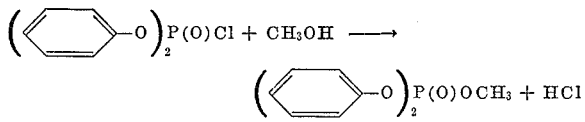

Unfortunately, in actual practice this reaction does not yield methyl diphenyl phosphate in the desired stoichiometric quantities. A principal problem encountered in this process is the very undesirable adverse side reaction of the methyl diphenyl phosphate with the by-product hydrogen chloride according to the following reaction scheme:

(II)

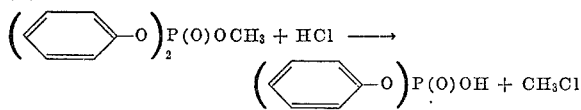

The methyl substituent of the phosphate ester is far more susceptible to this adverse cleavage reaction with hydrogen chloride than the phenyl group, and this reaction occurs as long as the hydrogen chloride and the methyl substituted phosphate are in contact. It is particularly acute during operations relating to the separation of the products. To make matters worse, this cleavage reaction is extremely difficult to control and it even occurs at temperatures as low as 0° C. Consequently, separation of hydrogen chloride from the reaction mass is an extremely difficult operation and no practical way has heretofore been found to substantially reduce the undesirable cleavage of the methyl group from the methyl diphenyl phosphate so that large scale commercial manufacture of this compound could become a reality.

Another very serious cleavage problem is produced by unesterified P—Cl bonds within the diaryl phosphorochloridate which cannot be separated from the final product by any known practical methods. Under conditions required for the separation of reaction products, any reactant which is not completely esterified condenses with the cleavage acids produced in accordance with the reaction II (forming P—O—P bonds) to liberate further hydrogen chloride. Thus, the potentially esterifiable diaryl phosphorochloridate is not only prevented from forming the desired alkyl diaryl phosphate but in addition produces still more hydrogen chloride which, in turn, reacts with formed alkyl diaryl phosphate to produce even more cleavage acids and more alkyl chlorides. This reaction sequence is symbolized as follows:

(III)

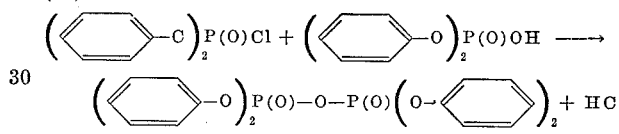

(IV)

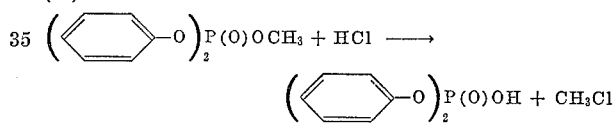

These adverse reactions, symbolized by Equations II, III and IV are particularly acute under the necessary conditions imposed by normal distillation to effect separation of the reaction mass to its component parts. For example, it is known in the prior art that when the separation of hydrogen chloride from the alkyl diaryl phosphate is attempted, even under mild conditions, that the yield of product decreases considerably even when the hydrogen chloride content in the feed is as little as 10 mole percent. Thus, a major and significant factor contributing to the failure of utilizing the alcohol diaryl phosphorochloridate reaction in a commercial process is the inability to obtain a practical method for separating the by-product of the reaction, particularly hydrogen chloride from the final product.

Another serious problem is that of producing an essentially chloride-free product when this material is to be used as a gasoline additive. Because of the extreme corrosiveness of such chlorides on engine parts, it is absolutely essential that the chlorides be maintained at a very low level.

Attempts to reduce acidity by washing have been unsuccessful in that numerous washing steps are required. The use of numerous washing steps contributes further to low yields of product.

Prior art processes have attempted to overcome these problems by using an excess of alcohol as an absorbent for the HCl. In a typical process excess alcohol and an aromatic solvent such as benzene are heated to reflux and a diaryl phosphorochloridate is gradually added to the refluxing mixture (British Pat. 734,768 pub. Aug. 10, 1955). Here as in other prior art processes, excess alcohol must be used which requires expensive processing for separation and recovery and, in some instances, it is completely lost due to reaction with the HCl.

The present invention provides a new method of preparing alkyl aryl phosphates from aryl phosphorohalidates which overcomes these problems in a simple and economic manner.

In accordance with the present invention, alkyl aryl phosphates are prepared by a process comprising the steps of:

(1) forming a solution of an aryl phosphorohalidate in a solvent mixture of an inert aliphatic hydrocarbon solvent having from 5 to 10 carbon atoms and an inert aromatic hydrocarbon solvent selected from the group consisting of benzene, toluene, xylene and mixtures thereof;
(2) heating the solution to reflux temperature; and
(3) incrementally adding an alcohol to the refluxing solution in an amount sufficient to effect alkoxylation of the aryl phosphorohalidate with the attendant formation of a haloacid by-product; and
(4) refluxing the admixture until substantially all by-product haloacid is evolved.

By this process, efficient removal of by-product haloacid can be effected, a low acidity product in good yield is obtained without excessive product washing, and alcohol recovery problems are obviated.

The aryl phosphorohalidate compounds used in the present invention can be represented by the formula:

(V)          $(ArO)_{3-x}-P(O)Hal_x$ wherein Ar is an aryl radical, Hal is a halogen selected from the group consisting of chlorine, bromine and iodine and $x$ is 1 or 2. Examples of such compounds are phenyl phosphorodichloridate, phenyl phosphorodibromidate, phenyl phosphorodiiodidate, tolyl phosphorodichloridate, naphthyl phosphorodichloridate, diphenyl phosphorobromidate, diphenyl phosphorochloridate, ditolyl phosphorobromidate, phenyl naphthyl phosphoroiodidate and the like, preferably, the aryl group is phenyl tolyl or xylenyl and the halogen moiety is chlorine. It has been found that diphenyl phosphorochloridate is a particularly effective reactant for use in the process of the present invention.

The alcohol which is employed in the process of this invention can be defined as one selected from the group of alcohols represented by the following structural formula:

(VI)          ROH wherein R can be alkyl and substituted alkyls, such as arylalkyl, cycloalkyl, alkoxyalkyl, alkylthioalkyl, haloalkyl, alkenyl, alkynyl hydroxyalkyl, etc. The invention is intended to include all alcohols where the alcoholic OH group is attached to an aliphatic carbon atom. The term alkyl as used herein is intended to include substituted alkyls. Examples of alcohols which can be used in the process of the present invention are: methyl, ethyl, propyl, isopropyl, butyl, amyl, isooctyl, 2-ethylhexyl, benzyl, beta-phenylethyl, 2-methoxyethyl, 2-ethoxyethyl, 2-butoxyethyl, phenoxyethyl, cyclohexyl, chloroethyl, ethylene glycol, propylene glycol, 1,3-propanediol, and the like. Preferably, the alcohol is a lower alkyl alcohol of from 1 to 4 carbon atoms and more preferably methanol.

For reaction of the aryl phosphorohalidate and the alcohol it is desirable to use at least a stoichiometric amount of alcohol, e.g., the number of moles equivalent to the numerical value of $x$ in the Formula V. It is preferred to use a slight excess, e.g., less than about 20% excess and more preferably between about 5% and about 10% excess of alcohol in the reaction.

The inert solvent mixture comprises an inert aliphatic hydrocarbon solvent having from 5 to 10 carbon atoms and an inert aromatic hydrocarbon solvent. By inert is meant that the solvents are non-reactive with regard to the reactants, the products and the by-products of the reaction. The inert aliphatic hydrocarbon solvents can be illustrated by pentane, hexane, heptane, octane, nonane, decane and the like; branched hydrocarbons such as isooctane and isopentane; and cycloaliphatics such as cyclohexane and cyclopentane. Pentane, hexane and heptane are preferred because of their lower boiling points. The term inert aliphatic hydrocarbon solvent of from 5 to 10 carbon atoms is also intended to include mixtures of such solvents. The inert aromatic hydrocarbon solvents which can be used are benzene, toluene and xylene. Preferably, the aromatic solvent is toluene.

The inert solvent mixture can contain varying proportions of aliphatic to aromatic solvents. Preferably, the aliphatic solvent is present in greater proportions than the aromatic solvent in the solvent mixture. It has been found that an approximately 400% molar excess of aliphatic hydrocarbon solvent per mole of aromatic hydrocarbon solvent is an effective solvent mixture.

The aryl phosphorohalidate is dissolved in the solvent mixture prior to alkoxylation. The phosphorohalidate can be added to an already formed mixture of solvents or, preferably, dissolved in one of the solvents to which is added the second solvent. In one form of the invention, the phosphorohalidate is dissolved first in the aliphatic hydrocarbon solvent and then the aromatic solvent is added to the so-formed solution. Mixing temperature can be any temperature below reflux but preferably the mixing is conducted at room temperature.

Following the formation of the solution of the phosphorohalidate in the mixed solvent system, the solution is heated to reflux and the alcohol for the alkoxylation reaction is incrementally added to the refluxing solution. The alcohol can be added as a continuous stream or periodically in small amounts over an extended time period. As used herein, the term incremental is intended to include intermittent additions as well as uninterrupted or continuous additions with the proviso that the rate of addition is such as to prevent an excess of unreacted alcohol from collecting in the reaction mixture. The rate of alcohol addition is controlled so as to prevent significant product degradation and reaction of by-product haloacid with alcohol. It has been found that, in using small reaction vessels, that an addition time of from about 0.005 to about 0.05 mole of alcohol per minute is highly effective. The reaction vessel is preferably equipped with an agitator to insure thorough admixture of reactants and assistant in liberation of by-product haloacid.

Following the incremental addition of the alcohol to the solution, the solution is refluxed to effect evolution of by-product haloacid. Preferably, the refluxing is continued until substantially all by-product haloacid is evolved from the solution as indicated by an absence of haloacid evolution from the solution for a period of about 10 minutes under reflux conditions.

The process of the present invention can be accomplished as a batch reaction or as a continuous reaction. The continuous reaction can be carried out by initiating the process under the conditions outlined hereinbefore, periodically adding small amounts of the desired aryl phosphorhalide and alcohol to a reaction vessel in the ratio necessary to provide the desired product, while simultaneously refluxing by-product haloacid from the system. Periodically, small amounts of the reaction vessel liquor are withdrawn and the desired alkyl aryl phosphate can be separated and purified. This process can be carried out continuously by continuously adding small amounts of $(ArO)_2POCl$ and ROH to the reaction vessel in the proper ratio and continuously refluxing out the HCl and alcohol, but returning the hydrocarbon that distills out continuously. The alcohol-HCl mixture in the distillate may be separated and the alcohol continuously returned to the pot. A small amount of the pot liquid contents may be continuously withdrawn and is then refluxed in another pot and a small amount continuously withdrawn from that pot for final purification, which may also be done continuously.

The product can be separated from the reaction mixture by distillation of volatiles, conveniently by means of vacuum distillation. Prior to distillation, it is preferred to wash the product mixture with a dilute solution of sodium carbonate or other HCl-neutralizing agent in water followed by water washing the product mixture. Other basic agents such as sodium hydroxide, sodium bicarbonate, calcium carbonate, lime, ammonia and the like can also be used.

The compounds prepared in accordance with method of the invention are useful as gasoline additives, polymer plasticizers, hydraulic fluids, etc.

The process of the invention is further illustrated in the examples which follow:

EXAMPLE 1

100 grams of phenyl phosphorochloridate having the composition:

| | Percent |
|---|---|
| Monophenyl phosphorodichloridate | 8 |
| Diphenyl phosphorochloridate | 77 |
| Triphenyl phosphate | 15 | is admixed at 25° C. with 80 grams of hexane (forming a two layer mixture) in a 500 milliliter flask fitted with magnetic stirring bar, thermometer, dropping funnel and reflux condenser with outlet tube leading through a calcium sulfate drying tube to a water trap to collect byproduct HCl. 24.7 grams of toluene is then added to the mixture. The mixture is then heated to reflux and 10.5 grams (9% excess) of methanol is added dropwise over a 38 minute period. The reaction mixture is maintained under reflux conditions for 12 hours. By-product HCl is trap measured, at the end of the 12 hours. 0.28 mole or 93.5% of theoretical. To the product mixture is added 25 milliliters of benzene and this admixture is washed twice with 20 milliliters of 10% $Na_2CO_3$ solution. The product mixture is then washed once with 40 milliliters of water and distilled at 100° C. under a vacuum of 0.1 millimeter of mercury. 84.7 grams (86.1% yield) of amber colored, liquid methyl diphenyl phosphate is obtained.

EXAMPLE 2

Example 1 is repeated using heptane in place of hexane. Substantially identical product yields are obtained after 6 hours of refluxing.

What is claimed is:
1. A method for preparing alkyl aryl phosphates of the formula:

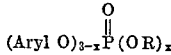

wherein R represents alkyl, arylalkyl, cycloalkyl, alkoxyalkyl, alkylthioalkyl, chloroalkyl, and hydroxyalkyl, said alkyl groups of said aforelisted radicals having from 1 to 8 carbon atoms comprising the steps of:

(a) forming a solution of an aryl phosphorohalidate of the formula:

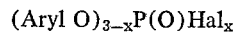

wherein Hal is halogen of chlorine, bromine, and iodine, and $x$ is an integer of 1 or 2 in a cosolvent mixture of an inert aliphatic hydrocarbon solvent having from 5 to 10 carbon atoms and an inert aromatic hydrocarbon solvent selected from the group consisting of benzene, toluene, xylene, and mixtures thereof, wherein the aliphatic solvent is present in greater proportion than the aromatic solvent up to and including a 400% molar excess of aliphatic solvent per mole of aromatic hydrocarbon solvent;

(b) heating the solution to reflux temperature;

(c) incrementally adding an alcohol of the formula ROH wherein R is as defined above to the refluxing solution to effect alkoxylation of the aryl phosphorohalidate with the attendant formation of a haloacid by-product; and (d) refluxing said solution for a period of time sufficient to remove substantially all by-product haloacid from said solution.

2. A method as recited in claim 1 wherein $x$ is 1.

3. A method as recited in claim 1 wherein said aryl group is phenyl.

4. A method as recited in claim 1 wherein said halogen is chlorine.

5. A method as recited in claim 1 wherein said alcohol is methanol.

6. A method as recited in claim 1 wherein said inert aliphatic hydrocarbon solvent is hexane.

7. A method as recited in claim 1 wherein said inert aromatic hydrocarbon solvent is toluene.

8. A method as recited in claim 1 wherein said alcohol is used in an excess of about 5 to about 20%.

9. A method as recited in claim 1 wherein said aryl phosphorohalidate is diphenyl phosphorochloridate.

10. A method as recited in claim 1 which includes the further steps of periodically adding to said refluxing solution additional amounts of said aryl phosphorohalidate and said alcohol in sufficient proportion to provide the desired alkyl aryl phosphate and periodically removing from said solution formed alkyl aryl phosphate.

11. The method as recited in claim 1 wherein aryl represents an aryl radical of phenyl or naphthyl.

References Cited
UNITED STATES PATENTS 2,668,174   2/1954   Horback et al. _____ 260—973 X ALEX MAZEL, Primary Examiner A. H. SUTTO, Assistant Examiner U.S. Cl. X.R.

260—974, 975, 976